(12) United States Patent
McLaughlin (10) Patent No.: US 9,910,764 B2
(45) Date of Patent: Mar. 6, 2018

(54) AUTOMATED SOFTWARE TESTING

(71) Applicant: LinkedIn Corporation, Mountain View, CA (US)

(72) Inventor: Seth McLaughlin, Palo Alto, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 112 days.

(21) Appl. No.: 14/312,171

(22) Filed: Jun. 23, 2014

(65) Prior Publication Data

US 2014/0380281 A1    Dec. 25, 2014

Related U.S. Application Data

(60) Provisional application No. 61/838,780, filed on Jun. 24, 2013.

(51) Int. Cl.
*G06F 9/44* (2006.01)
*G06F 11/36* (2006.01)

(52) U.S. Cl.
CPC ...... *G06F 11/3688* (2013.01); *G06F 11/3664* (2013.01); *G06F 11/3668* (2013.01)

(58) Field of Classification Search
CPC .................................. G06F 11/36–11/3664
See application file for complete search history.

(56) References Cited

U.S. PATENT DOCUMENTS

| | | | | |
|---|---|---|---|---|
| 6,620,204 B1 * | 9/2003 | Malcolm | ............. | G06F 11/3664 714/38.11 |
| 8,166,458 B2 * | 4/2012 | Li | ......................... | G06F 9/5038 709/223 |
| 8,296,445 B1 * | 10/2012 | Hackborn | ........... | G06F 11/3664 709/228 |
| 8,788,885 B1 * | 7/2014 | Cook | ................. | G06F 11/3664 714/25 |
| 8,924,934 B2 * | 12/2014 | Sullivan | ........................ | 715/716 |
| 9,223,684 B2 * | 12/2015 | Gittelman | ........... | G06F 11/3664 |
| 9,256,452 B1 * | 2/2016 | Suryanarayanan | ....... | G06F 9/44 |
| 2007/0168970 A1 * | 7/2007 | Li | ......................... | G06F 9/5038 717/124 |

(Continued)

OTHER PUBLICATIONS

Il-Chul Yoon et al., Direct-Dependency-based Software Compatility Testing, ACM 2007, retrieved online on Aug. 2, 2017, pp. 409-412. Retrieved from the Internet: <URL: http://delivery.acm.org/10.1145/1330000/1321696/p409-yoon.pdf?>.*

(Continued)

*Primary Examiner* — Hanh T Bui
(74) *Attorney, Agent, or Firm* — Schwegman Lundberg & Woessner, P.A.

(57) ABSTRACT

Disclosed in some examples are systems, machine readable mediums and methods which automate testing of web-based application code by automatically generating test harnesses based on a specified configuration and test script, hosting the test harness, causing the test harness to be run to test the code, and delivering the test results to the user. In some examples, the specified conditions may specify one or more test environments corresponding to an execution environment. This allows users greater flexibility in support of testing libraries and support of testing environments. The end users of the software under test will be provided software that is better tested for many different environments.

21 Claims, 3 Drawing Sheets

(56) References Cited

U.S. PATENT DOCUMENTS

| | | | | |
|---|---|---|---|---|
| 2007/0220341 A1* | 9/2007 | Apostoloiu | .......... | G06F 11/3664 714/33 |
| 2011/0289489 A1* | 11/2011 | Kumar | ................ | G06F 11/3664 717/135 |
| 2012/0204091 A1* | 8/2012 | Sullivan | .............. | G06F 11/3664 715/234 |
| 2012/0246619 A1* | 9/2012 | Thirumalai | ......... | G06F 11/3664 717/124 |
| 2013/0297973 A1* | 11/2013 | Hyland | ................... | G06F 11/28 714/27 |
| 2014/0075344 A1* | 3/2014 | Bentrup | .............. | G06F 11/3664 715/760 |
| 2015/0089299 A1* | 3/2015 | Gittelman | ........... | G06F 11/3664 714/38.14 |
| 2016/0077949 A1* | 3/2016 | Gittelman | ........... | G06F 11/3664 714/38.14 |

OTHER PUBLICATIONS

McLaughlin, Seth, "code.txt (Venus.js computer program listing)", (Jun. 24, 2013), 590 pgs.

McLaughlin, Seth, "Venus.js, a flexible and extensibie execution environment for JavaScript unit testing", [Online]. Retrieved from the Internet: <URL: https://engineering.linkedin.com/javascript/venusjs-flexibie-and-extensible-execution-environment-javascript-unit-testing>, (Mar. 12, 2013), 34 pgs.

\* cited by examiner

AUTOMATED SOFTWARE TESTING

PRIORITY CLAIM

This patent application claims the benefit of priority, under 35 U.S.C. Section 119 to U.S. Provisional Patent Application Ser. No. 61/838,780 entitled "VENUS JS," filed on Jun. 24, 2013, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, Inc., All Rights Reserved.

BACKGROUND

JavaScript is a popular web programming computer language. JavaScript is often used by interactive web pages to allow client-side scripts to interact with the user, control the browser, communicate asynchronously, and alter the document content that is displayed.

The inherent complexities of computer programming require developers to test code to ensure it functions correctly. Typically, developers test code using test cases which test the functionality of the code. A test case may be a set of conditions or variables under which a tester will determine whether a computer program or one of its features is working as it was originally designed. The test cases may be executed from the perspective of the user, called black-box testing, or executed with knowledge of the underlying code, called white-box testing.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As JavaScript is often used in connection with webpages and client side interfaces, testing JavaScript often requires the time consuming process of generating a webpage which implements the desired test cases. These test webpages are called test harnesses. A test harness is a collection of software which implements one or more test cases designed to test the software for the test cases under varying conditions. In some examples, a test harness may allow the testing to be automated. The test harness runs the test cases by calling the underlying software according to the specified conditions in the test cases. In some examples, test harnesses may also be used to provide the browser with test results to be displayed for the developer. Testing on a large scale often utilizes many different test harnesses or a few large and complex test harnesses which can be difficult to build and maintain.

In addition to the problems involved with managing large test harnesses, companies that develop large scale web applications or other kinds of computer code often need their computer programs to be compatible with many different execution environments. An execution environment comprises a configuration of hardware and software resources upon which the application is to run. For example, in the case of JavaScript, an execution environment may comprise an operating system and an Internet browser. The many different execution environments create difficulties in guaranteeing working code on all environments and add to the complexity of trying to ensure proper execution across all execution environments. Failure to test the entire spectrum of execution environments could lead to inconstancies across environments and disappoint the end users of the developed software. The goal in testing web-based application software should be to maintain a spectrum of testing environments that closely resembles the execution environments used by all end users. A testing environment is an environment meant to be or simulate a particular execution environment for the purposes of testing code.

Disclosed in some examples are systems, machine readable mediums and methods which automate testing of web-based application code by automatically generating test harnesses based on a specified configuration and test script, hosting the test harness, causing the test harness to be run to test the code, and delivering the test results to the user. In some examples, the specified configuration may specify one or more test environments corresponding to an execution environment. This allows users of the disclosure greater flexibility in support of testing libraries and support of testing environments. The end users of the software under test will be provided software that is better tested for many different environments.

Figure 1:
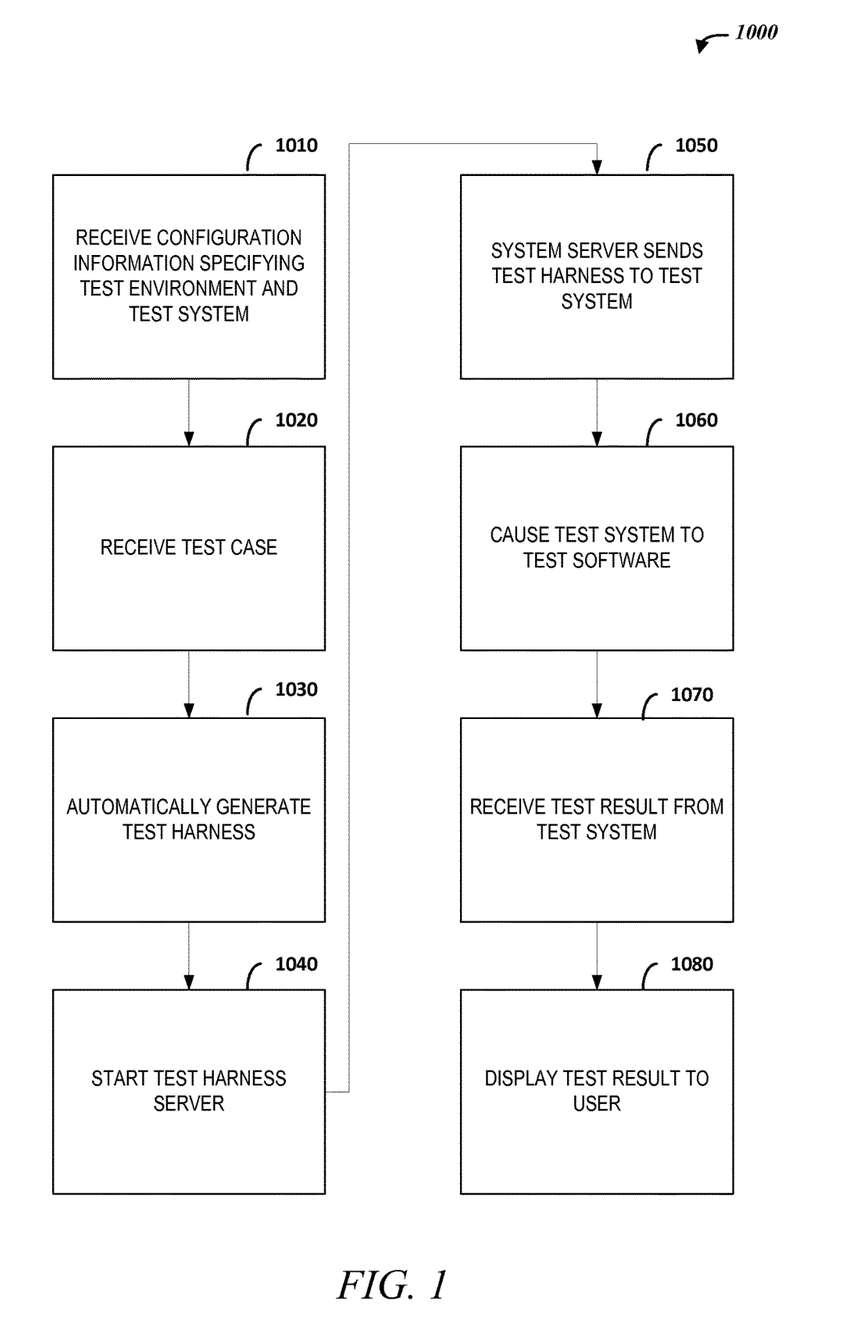
FIG. 1 is a flowchart of a method of unit testing software according to some examples of the present disclosure.

FIG. 1 shows an example flowchart of a method 1000 of testing web-based application code according to some examples of the present disclosure. At operation 1010, the system receives configuration information specifying information describing the test environment and the test system. A test system may be any type of computing device capable of operating as one or more test environments. In some examples, the system receives the configuration information as command line parameters specifying the test environment. In some examples, the system receives the configuration information as parameters defined in a graphical user interface (GUI). In other examples, the configuration information may be defined in configuration files that are accessed by the system. In some examples, the specified test environment may comprise the operating system that the test is run on and the version of the operating system as well as the web browser and web browser version that the test is run on. Some examples of operating systems include Microsoft Windows®, Macintosh OS X®, Linux®, and many others. Some examples of web browsers include Microsoft Internet Explorer®, Safari®, Opera®, Chrome®, Firefox®, etc. The test environment may include any combination of a version of operating system and a version of the web browser, e.g., Microsoft Windows 7® running Microsoft Internet Explorer 8®.

The specified test system may be either an external test system or may utilize an internal test system within the disclosed system. As already noted, a test system may be any type of computing device capable of operating as one or more test environments. In some examples, internal test systems may not need to be linked to a network, but external systems may need to be connected to a network to communicate with the disclosed system. An example of an internal test system may be a personal computer. Some examples of external test systems may include cloud computing servers, also known as remote servers, such as Selenium-Grid® or personal computers operating separately from the disclosed system.

An example of a configuration is listed below:

```
environments: {
    ie7: {
        uac: 'WebDriverUac',
        browser: 'internet explorer',
        version: '7.0',
        host: 'selenium-0101.corp.net',
        port: 4444
    },
    ie8: {
        uac: 'WebDriverUac',
        browser: 'internet explorer',
        version: '8.0',
        host: 'selenium-0101.corp.net',
        port: 4444
    },
    Ie9: {
        uac: 'WebDriverUac',
        browser: 'internet explorer',
        version: '9.0',
        host: 'selenium-0101.corp.net',
        port: 4444
    }
}
```

In the preceding example, the configuration file defines three web browsers, Internet Explorer version 7, Internet Explorer version 8, and Internet Explorer version 9. The parameter "uac" may describe a user application controller that tells the test system what browser to use. In this example, the parameters "host" and "port" describe the URL of the test system. As this example demonstrates, the configuration may comprise more than one test environment.

At operation 1020, the system receives test cases written by a test developer. In some examples, the test cases are written according to a test framework. A test framework may be a protocol for test developers to write the test cases. Test frameworks may set the rules for automation of unit testing the software. The software under test may be tested using test cases provided by test developers. By using a test framework, test developers are able to standardize the way test cases are written and how the test results are presented. Some examples of test frameworks include Mocha®, Jasmine®, QUnit®, Jarvis®, and Unit.js®. In some examples, the system receives the test cases by reading one or more files in the system's storage. In other examples, the system may receive the test cases by reading files on a network. In some examples, the test cases may test one or more components of the software. The test cases may be written in the same programming language as the software under test, but can also be written in compatible programming languages. Compatible programming languages may include any programming language that is capable of executing the software under test. For example, if the software being tested is in the JavaScript programming language, tests cases may be written in Ruby, C#, Python, etc. Test cases may call functions in the software and provide the function with particular input. The test cases then allow the function in the software to run and the test cases expect particular output from the function. If the output is the same as what the test case expected, the test passed, if the output is different than the test case expected, the test failed.

At operation 1030, the system uses the code under test, the test cases, and all dependencies to automatically generate a test harness. In some examples, when the test harness is loaded in a browser, the test harness page will run the tests and display the results to the user. In many examples, the test harness is generated using test cases written to be compatible with a specified test framework. The test harness allows the test system to run the test cases and links the tests to the software under test. In some examples, the test harness is an HTML webpage. The test harness assembles all the test cases that were received so that they can be run on the test system. The test harness may also generate test results that can be displayed to users of the system. In some examples, the results are transmitted back to the system through the server, where they may be logged.

The system starts the test harness server at operation 1040 by hosting the test harness such that it can be reached by internal or external computing devices. The server may be on the system running the disclosed method and may be served internally or externally if the test system is an external system. In some examples, the test server runs on the disclosed system. The location at which the test harness is served may be a resource locator such as a uniform resource locator (URL), which describes the server location so it can be reached from the World Wide Web. As an example, the server may have a location such as http://127.0.0.1:2013.

At operation 1050, the system server sends the test harness to the test system and sends configuration information specifying the test execution environment. In some examples, this is in response to a request from the test system. Depending on whether the test system is internal or external the system may send the test harness across a network. If the test system is external, then by sending the location across the network, the test system may be able to request the test harness. If the test system is internal, the internal test system module may simply be alerted to the location of the server to use the test harness. In some examples the system may send the test harness as one or more computer files.

At operation 1060, the disclosed system causes the test system to begin testing the software. The system may send a message to the test system, internal or external, to begin using the test harness to run the test cases. The test system may then run the test cases in the test harness using the specified testing environment. The test system may utilize a virtual machine to run the test in various testing environments. A virtual machine allows the test system to emulate the environment that is desired by the user. Using a virtual machine, the test system can better cover the entire spectrum of execution environments that end users run the software in.

As an example, the test system may be Selenium-Grid® and use a test environment comprising Macintosh OS X® and the Safari® web browser.

After the testing has completed on the test system, the system receives one or more test results from the test system at operation 1070. In some examples, the test results may be received as one or more computer files. In some examples, the test results may comprise one or more tests that passed the test. The test results may be displayed to the user at operation 1080. Displaying the test results may comprise using a monitor connected to the disclosed system and displaying the results on the monitor's screen. In some examples, the test results are displayed to the user in a web browser. In some examples, the test results may be displayed to the user by use of electronic mail.

Figure 2:
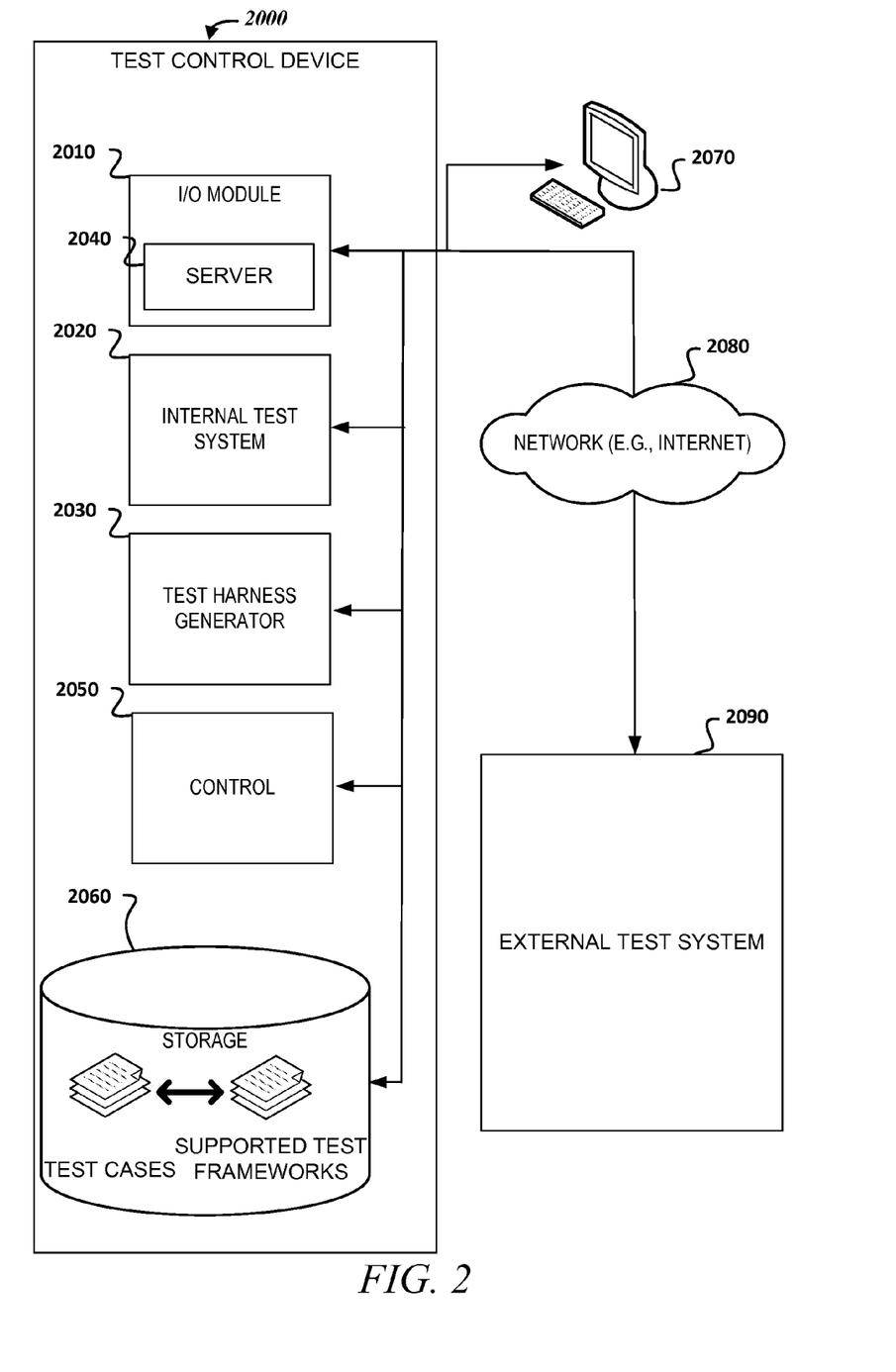
FIG. 2 is a block diagram of a system for unit testing software according to some examples of the present disclosure.

FIG. 2 shows a block diagram of an example system 2000 capable of implementing method 1000. The system 2000 may include a link to a user interface 2070 for the system 2000 to receive commands from the user and display output to the user. The user interface 2070 may be linked to an I/O module 2010 within the system 2000. The I/O module 2010 may be used to connect the system 2000 with other systems or a Network 2080. The connection to the Network 2080 may allow an external test system 2090 to be connected. In some examples, the external test system 2090 is a remote server and may comprise one or more computing devices. In some examples, the external test system 2090 executes a virtual machine to simulate a plurality of test environments. In some examples, the internal test system 2020 may allow for testing without connection to the Network 2080. The test harness generator 2030 may be used to automatically generate test harness using the specified test environment, test system, and test cases. The test harness generator 2030 may utilize the configuration information describing test frameworks which may be stored in storage 2060 in generating the test harness. In some examples, the test harness is hosted on the server 2040 at a resource locator to be reached on the Network 2080. In some examples, configurations, test cases, and selections supported test frameworks are stored in storage 2060. The control module 2050 may coordinate with the I/O module 2010, internal test system 2020, test harness generation 2030 and storage 2060 to perform the method shown in FIG. 1.

The software being tested may be software developed as an Internet application, for example using the JavaScript programming language. The software being test may alternatively be other types of software being developed for use by an end user. In some examples, the software under test may be written using C#, CSS, HTML, Java, Perl, PHP, Python, Ruby, or other web-based application programming languages.

The present disclosure supports a plurality of test frameworks. A test framework is a protocol for test developers to write the test cases. Test frameworks set the rules for automation of unit testing the software. The software under test may be tested using test cases provided by test developers. By using a test framework, test developers can standardize the way test cases are written and how the test results are presented. Some examples of test frameworks include Mocha®, Jasmine®, QUnit®, Jarvis®, and Unit.js®. In some examples, a developer may create a new test framework and adapt the system to be compatible with the new test framework.

As an example of a test case using a test framework, consider using Mocha® to test the following JavaScript functions in a file named Tools.js:

```
var Tools = function ( ) {
    this.items = [ ];
};
Tools.prototype.addItem = function (item) {
    this.items.push(item);
};
Tools.prototype.getPrimaryItem = function ( ) {
    return this.items[0];
};
```

The following code listing allows a user to create a new Tools object, to add an item, and to get the primary item. The following code in Tools.spec.js is written according to the Mocha® test framework standard:

```
/**
 * @venus-library mocha
 * @venus-include Tools.js
 */
describe(' Tests for Tools.js', function ( ) {
    var myTools;
    it('should return the primary item', function ( ) {
        myTools = new Tools( );
        myTools.addItem('foo');
        myTools.addItem('bar');
        expect(myTools.getPrimaryItem( )).to.be('foo');
    };
};
```

Many of the supported test frameworks use annotations to include the software under test and identify the test framework used Annotations may be listed at the beginning of test cases and may identify which test framework the test is written for. In the example above, Tools.spec.js uses the annotation "@venus-library mocha" to identify the test framework as Mocha®. The following line: "@venus-include Tools.js" is an annotation that describes which software is included for test. Test cases can specify which parts of the software are to be tested, how the software is to be tested, and what the intended outcome may be. In the example, the test creates a new Tools object, adds two items, and then checks that the returned item is as expected. In this simple test, all the functions of Tool.js have been tested. The function "it" is the actual test case. The function allows the test developer to specify what the test is expected to do. Functions like "expect" are common in test frameworks like Mocha®, so to use a different test framework, the test developer could use a different framework in the annotation and then use the analogous function to "expect" in that framework.

The test harness that the system generates from the example may be as follows:

```
<!DOCTYPE html>
<html>
<head>
    <title>Venus Test Harness (Sandbox)</title>
    <script src="/js/runner_client/console.log.js"
    type="text/javascript"></script>
</head>
<body>
    <script src="/temp/test/1/lib/mocha-1.12.0.js"
type="text/javascript"></script><script src="/temp/test/1/lib/expect.js"
type="text/javascript"></script><script src="/temp/test/1/lib/venus-
fixture.js" type="text/javascript"></script><script
src="/temp/test/1/lib/adaptor-template.js"
type="text/javascript"></script><script
src="/temp/test/1/lib/venus-mocha-1.12.0.js"
type="text/javascript"></script><script
```

-continued

```
src="/temp/test/1/lib/sinon-1.5.0.js"
type="text/javascript"></script><script
src="/temp/test/1/includes/Tools.js"
type="text/javascript"></script><script type="text/javascript">
window.adaptor = new Adaptor( );
  </script><script src="/temp/test/1/test/Tools.spec.js"></script><script
type="text/javascript">
window.parent.venus.beforeHook( ).then(function ( )
{window.adaptor.start( );});
  </script>
</body>
</html>
```

The console output from running the example test harness in a browser may be as follows:

```
info:   Venus server started at http://127.0.0.1:2013 and is serving 1 test
        files
info:   Serving test: http://127.0.0.1:2013/venus-core/1
        Chrome 35 /Users/u1/temp/tools/Tools.spec.js
        Test for Tools.js
        -------------------
          ✓ should return the primary item
```

The test results may be formatted to separate results between various tests. The test developer may choose to navigate to the URL and view the test results. As an alternative, the test developer may use the developer tools with their browser and use the tools as a software debugger.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computing devices (e.g., a standalone, client or server computing device) or one or more hardware modules of a computing device (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing device can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 3:
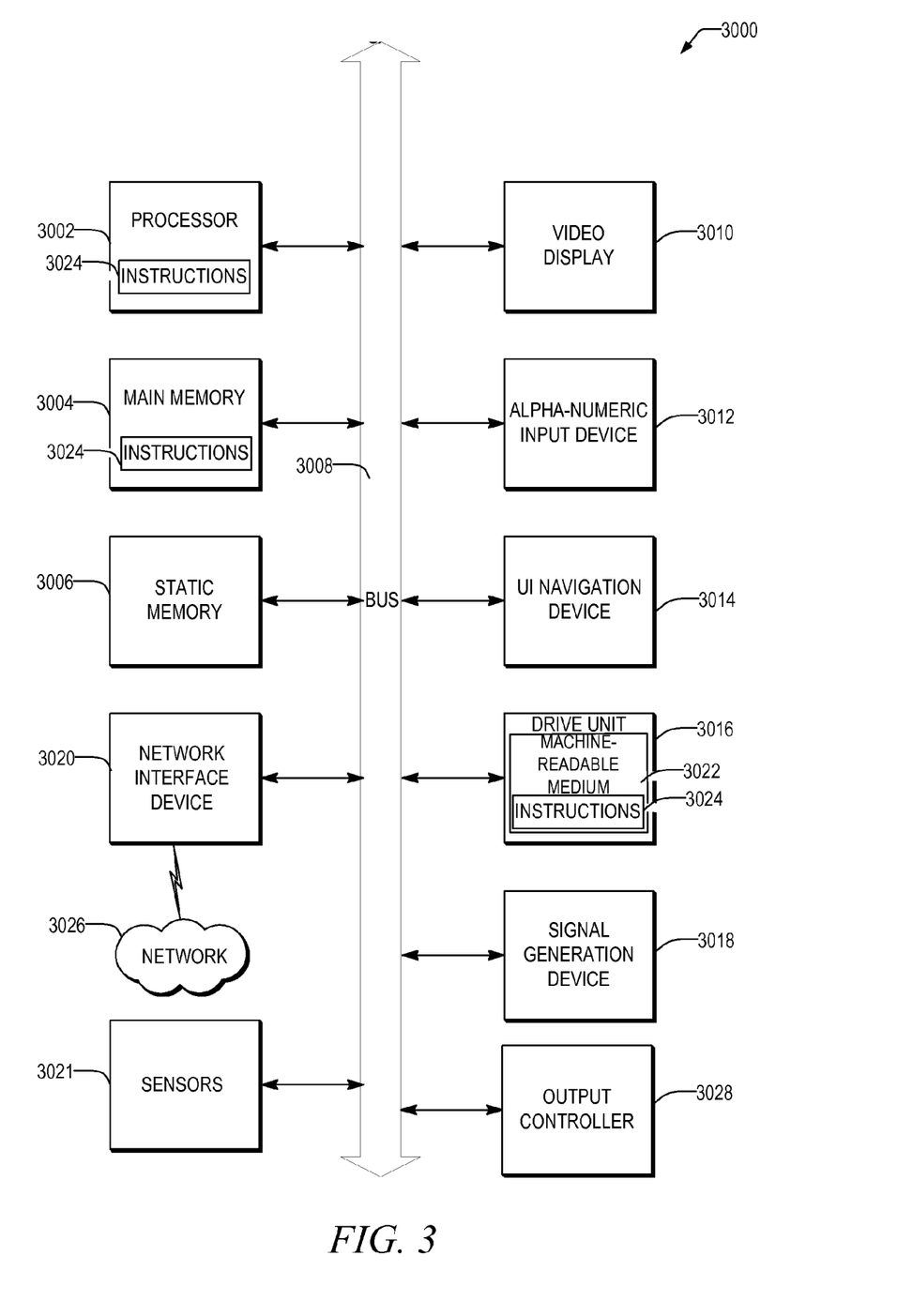
FIG. 3 is a block diagram illustrating an example of a machine upon which one or more embodiments may be implemented.

FIG. 3 is a block diagram of machine in the example form of a computing device 3000 within which instructions, for causing the machine to perform any one or more of the methodologies discussed herein, may be executed. For example, any one of the components shown in FIG. 2 may be or contain one or more of the components described in FIG. 3. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 3 or only a subset of the components shown in FIG. 3.

The example computing device 3000 includes a processor 3002 (e.g., a central processing unit (CPU), a graphics processing unit (GPU) or both), a main memory 3004 and a static memory 3006, which communicate with each other via a bus 3008. The computing device 3000 may further include a video display unit 3010 (e.g., a liquid crystal display (LCD) or a cathode ray tube (CRT)). The computing device 3000 may also include an alphanumeric input device 3012 (e.g., a keyboard), a user interface (UI) navigation device 3014 (e.g., a mouse), a disk drive unit 3016, a signal generation device 3018 (e.g., a speaker) and a network interface device 3020.

Machine-Readable Medium

The disk drive unit 3016 includes a machine-readable medium 3022 on which is stored one or more sets of instructions and data structures (e.g., software) 3024 embodying or used by any one or more of the methodologies or functions described herein. The instructions 3024 may also reside, completely or at least partially, within the main memory 3004, static memory 3006, and/or within the processor 3002 during execution thereof by the computing device 3000, the main memory 3004 and the processor 3002 also constituting machine-readable media.

While the machine-readable medium 3022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-transitory memory, including by way of example, random access memory (RAM), semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 3024 may further be transmitted or received over a communications network 3026 using a transmission medium. The instructions 3024 may be transmitted using the network interface device 3020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 3020 may wirelessly transmit data and may include an antenna. Transmissions to other types of devices may be controlled by output controller 3028. Environmental conditions (e.g., light, temperature, humidity, pressure, etc.) may be observed by sensors 3021.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

OTHER NOTES AND EXAMPLES

The following are non-limiting examples.

Example 1 includes subject matter (such as a method, means for performing acts, machine readable medium including instructions that, when performed by a machine cause the machine to perform acts, or an apparatus configured to perform acts) comprising: testing software, the method comprising using one or more computer processors to perform the operations of receiving a command from a user to test the software using a configuration selected from a plurality of configurations, the configuration specifying a test environment and a test system, wherein the test system is any computing device capable of simulating the test environment; receiving a test case written in accordance with one of a plurality of compatible test frameworks; automatically generating a test harness for the test based upon the test case and the software; hosting the generated test harness at a determined resource locator; causing the test system to request the test harness; receiving a request from the test system to provide the test harness, and responsive to receiving the request, providing the test harness to the test system and causing the test system to run the test in the configuration specified by the test environment; receiving the test result from the test system; and displaying the test result to the user.

In Example 2, the subject matter of Example 1 may optionally include, wherein the test software comprises a JavaScript application.

In Example 3, the subject matter of any one or more of Examples 1-2 may optionally include, wherein the test environment specifies a selection of a type of Internet browser and wherein the test system executes the test harness in an instance of the selected type of Internet browser to run the test.

In Example 4, the subject matter of any one or more of Examples 1-3 may optionally include, wherein the testing system is located on a remote server.

In Example 5, the subject matter of any one or more of Examples 1-4 may optionally include, wherein the remote server uses a virtual machine to simulate the selected testing environment.

In Example 6, the subject matter of any one or more of Examples 1-5 may optionally include, wherein the test system is executed by the one or more processors.

In Example 7, the subject matter of any one or more of Examples 1-6 may optionally include, further comprising: receiving a second test case written in accordance with a different one of a plurality of compatible test frameworks; and automatically generating the test harness for the test based also upon the second test case.

In Example 8, includes or may optionally be combined with the subject matter of any one of Examples 1-7 to include subject matter (such as a device, apparatus, or machine) comprising a system of testing software, the system comprising: one or more computer processors configured to include: an I/O module configured to: receive a command from a user to test the software using a configuration selected from a plurality of configurations, the configuration specifying a test environment and a test system, wherein the test system is any computing device capable of simulating the test environment; receive a test case written in accordance with one of a plurality of compatible test frameworks; a test harness generator module configured to: automatically generate a test harness for the test based upon the test case and the software; the I/O module further configured to: host the generated test harness at a determined resource locator; cause the test system to request the test harness; receive a request from the test system to provide the test harness, and responsive to receiving the request, provide the test harness to the test system and causing the test system to run the test in the configuration specified by the test environment; receive the test result from the test system; cause a display of the test result to the user.

In Example 9, the subject matter of any one or more of Examples 1-8 may optionally include, wherein the test software comprises a JavaScript application.

In Example 10, the subject matter of any one or more of Examples 1-9 may optionally include, wherein the test environment specifies a selection of a type of Internet browser and wherein the test system executes the test harness in an instance of the selected type of Internet browser to run the test.

In Example 11, the subject matter of any one or more of Examples 1-10 may optionally include, wherein the testing system is located on a remote server.

In Example 12, the subject matter of any one or more of Examples 1-11 may optionally include, wherein the remote server uses a virtual machine to simulate the selected testing environment.

In Example 13, the subject matter of any one or more of Examples 1-12 may optionally include, wherein the test system is executed by the one or more processors.

In Example 14, the subject matter of any one or more of Examples 1-13 may optionally include, wherein the I/O module is further configured to: receive a second test case written in accordance with a different one of a plurality of compatible test frameworks; and the test harness generator module is further configured to: automatically generate the test harness for the test based also upon the second test case.

What is claimed is:

1. A method of testing software, the method comprising: using one or more computer processors to perform operations of:
    receiving a command from a user to test the software using a configuration selected from a plurality of configurations, the configuration specifying a test environment and a test system, wherein the test system is any computing device capable of simulating the test environment;
    receiving a test case in a test case file written in accordance with one of a plurality of compatible test frameworks;
    automatically generating a test harness for the software test from the received test case and the software under test, the test harness executing the received test case by calling unmodified code for the software under test according to conditions specified in the received test case, the test harness comprising the unmodified code for the software under test and code for at least one test case, wherein the test harness code and the unmodified code for the software under test are two different coding languages;
    hosting the generated test harness at a determined resource locator;
    causing the test system to request the generated test harness;
    receiving a request from the test system to provide the generated test harness, and responsive to receiving the request, providing the generated test harness and the configuration specified by the test environment to the test system and causing the test system to run the software test according to the test case in the configuration specified by the test environment;
    receiving a software test result from the test system; and
    displaying the software test result to the user.

2. The method of claim 1, wherein the software comprises an application written in a scripting language.

3. The method of claim 2, wherein the test environment specifies a selection of a type of Internet browser and wherein the test system executes the generated test harness in an instance of the selected type of Internet browser to run the software test.

4. The method of claim 1, wherein the test system is located on a remote server.

5. The method of claim 4, wherein the remote server uses a virtual machine to simulate the selected testing environment.

6. The method of claim 1, wherein the test system is executed by the one or more processors.

7. The method of claim 1, further comprising:
    receiving a second test case written in accordance with a different one of the plurality of compatible test frameworks; and
    wherein when the test harness is generated, the test harness includes both the test case and the second test case.

8. A system for testing software, the system comprising: one or more processors configured to:
    receive a command from a user to test the software using a configuration selected from a plurality of configurations, the configuration specifying a test environment and a test system, wherein the test system is any computing device capable of simulating the test environment;
    receive a test case in a test case file written in accordance with one of a plurality of compatible test frameworks;
    automatically generate a test harness for the software test from the received test case and the software under test, the test harness executing the received test case by calling unmodified code for the software under test according to conditions specified in the received test case, the test harness comprising the unmodified code for the software under test and code for at least one test case, wherein the test harness code and the unmodified code for the software under test are two different coding languages;
    host the generated test harness at a determined resource locator;
    cause the test system to request the generated test harness;
    receive a request from the test system to provide the generated test harness, and responsive to receiving the request, provide the generated test harness and the configuration specified by the test environment to the test system and causing the test system to run the software test according to the test case in the configuration specified by the test environment;
    receive a software test result from the test system; and
    cause a display of the software test result to the user.

9. The system of claim 8, wherein the software comprises an application written in a scripting language.

10. The system of claim 8, wherein the test environment specifies a selection of a type of Internet browser and wherein the test system executes the generated test harness in an instance of the selected type of Internet browser to run the software test.

11. The system of claim 8, wherein the test system is located on a remote server.

12. The system of claim 11, wherein the remote server uses a virtual machine to simulate the selected testing environment.

13. The system of claim 8, wherein the test system is executed by the one or more processors.

14. The system of claim 8, wherein the one or more processors are further configured to:
    receive a second test case written in accordance with a different one of the plurality of compatible test frameworks; and wherein when the test harness is generated, the test harness includes both the test case and the second test case.

15. A non-transitory machine readable medium that stores instructions which when performed by a machine, cause the machine to test software by performing operations comprising:

receiving a command from a user to test the software using a configuration selected from a plurality of configurations, the configuration specifying a test environment and a test system, wherein the test system is any computing device capable of simulating the test environment;

receiving a test case in a test case file written in accordance with one of a plurality of compatible test frameworks;

automatically generating a test harness for the software test from the received test case and the software under test, the test harness executing the received test case by calling unmodified code for the software under test according to conditions specified in the received test case, the test harness comprising the unmodified code for the software under test and code for at least one test case, wherein the test harness code and the unmodified code for the software under test are two different coding languages;

hosting the generated test harness at a determined resource locator;

causing the test system to request the generated test harness;

receiving a request from the test system to provide the generated test harness, and responsive to receiving the request, providing the generated test harness and the configuration specified by the test environment to the test system and causing the test system to run the software test according to the test case in the configuration specified by the test environment;

receiving a software test result from the test system; and displaying the software test result to the user.

16. The machine readable medium of claim 15, wherein the software comprises an application written in a scripting language.

17. The machine readable medium of claim 15, wherein the test environment specifies a selection of a type of Internet browser and wherein the test system executes the generated test harness in an instance of the selected type of Internet browser to run the software test.

18. The machine readable medium of claim 15, wherein the test system is located on a remote server.

19. The machine readable medium of claim 18, wherein the remote server uses a virtual machine to simulate the selected testing environment.

20. The machine readable medium of claim 15, wherein the test system is executed by the machine.

21. The machine readable medium of claim 15, wherein the operations comprise:

receiving a second test case written in accordance with a different one of the plurality of compatible test frameworks; and wherein when the test harness is generated, the test harness includes both the test case and the second test case.

* * * * *

UNITED STATES PATENT AND TRADEMARK OFFICE
CERTIFICATE OF CORRECTION

| | | |
|---|---|---|
| PATENT NO. | : 9,910,764 B2 | |
| APPLICATION NO. | : 14/312171 | |
| DATED | : March 6, 2018 | |
| INVENTOR(S) | : Seth McLaughlin | |

It is certified that error appears in the above-identified patent and that said Letters Patent is hereby corrected as shown below:

On the Title Page

In Column 2, item (56) under "Other Publications", Line 1, delete "Compatility" and insert --Compatibility-- therefor Signed and Sealed this
Eleventh Day of June, 2019

Andrei Iancu
*Director of the United States Patent and Trademark Office*